March 17, 1970        F. DVORAK        3,500,886

LOCK NUT ASSEMBLY

Filed Nov. 29, 1968

Inventor
FRED DVORAK
By

United States Patent Office 3,500,886
Patented Mar. 17, 1970

3,500,886
LOCK NUT ASSEMBLY
Fred Dvorak, Bellwood, Nebr. 68624
Substitute for application Ser. No. 652,396, June 26, 1967, which in turn was a substitute for application Ser. No. 419,918, Dec. 21, 1964. This application Nov. 29, 1968, Ser. No. 784,526
Int. Cl. F16b 39/00
U.S. Cl. 151—50    4 Claims

ABSTRACT OF THE DISCLOSURE

A lock nut and washer assembly comprising: a nut having an outer surface of a polygonal shape, said nut having an extension attached to one end thereof and having a substantially cylindrical exterior surface, and a washer clinging to the cylindrical extension to form a unit.

---

This application is a substitute for application, Ser. No. 652,396, filed June 26, 1967, now abandoned, which in turn was a substitute for application, Ser. No. 419,918, filed Dec. 21, 1964, now abandoned.

FIELD OF THE INVENTION

This invention is in the field of washer and nut assemblies in which the washer has resilient finger means frictionally engaging a nut or an extension thereof.

DESCRIPTION OF THE PRIOR ART

Heretofore there has never been a washer and nut assembly proposed in which the wrench-receiving part of the nut was substantially free of overlap by finger means of the washer as is necessary to make it possible for a workman to apply not only socket wrenches but also open end wrenches to the nut in engagement with those polygonal surfaces of the nut which are closest to the central part of the washer as well as those polygonal surfaces which are farthest from the washer and to swing the wrench freely around and around the nut with the wrench handle disposed at a right angle to the axis of the nut, and with the nut adapted to be wrench-rotatable in not only one but both directions for not only application but also convenient removal from a workpiece, and in which the washer can be easily and quickly placed on the nut.

SUMMARY OF THE INVENTION

A lock nut and washer assembly comprising: a nut having an outer surface of a polygonal shape, said nut having an extension attached to one end thereof and having a substantially cylindrical exterior surface engaging one end of said extension, said washer having a peripheral flange means provided with a plurality of spaced resilient fingers lapping and pressing against the cylindrical exterior surface of said extension on at least two opposite sides thereof to deter rotation of said extension with respect to said washer and to unite said nut and said washer into a unit during the period before application of the assembly to a workpiece, the unitary assembly making possible simultaneous handling by a workman, said fingers not substantially overlapping said polygonal portion so as not to substantially interfere with the application of a wrench to any of the parts of the said polygonal outer surface of said nut, said surface and the shape of said fingers being sufficiently cooperatively shaped and the said substantially cylindrical surface of said nut extension being sufficiently cylindrical so as to permit the rotation of said nut with respect to said fingers in each of two opposite directions without the necessity of breakage of said fingers.

Parts of the exterior of the nut extension which are lapped by said washer flange means extend outwardly from the rotational axis of the nut substantially no greater distance than the length of the radius of the cylindrical outer surface of said extension to make possible easy and rapid assembly. Parts of the abutting surfaces of the nut extension and washer, preferably the central part of the washer and the surface of the nut extension which abuts it, are purposely rough to resist rotation of the nut to prevent unwanted loosening.

Figure 1:
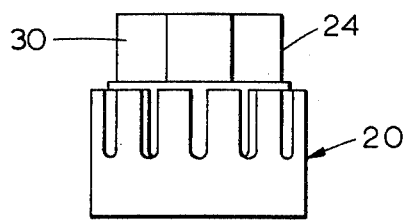
FIGURE 1 is a side elevation of the lock nut and washer assembly of this invention shown in assembled position. Criss-crossed lines in the several views indicate how rough surfaces are achieved by criss-crossed serrations.
Figure 2:
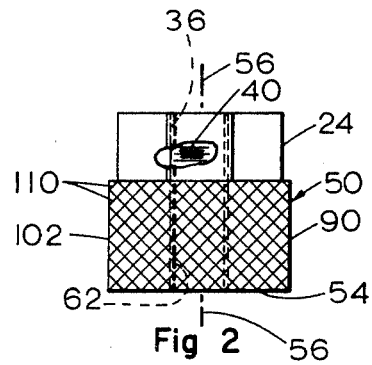
FIGURE 2 is a side elevation of the nut and collar portions of the assembly.
Figure 3:
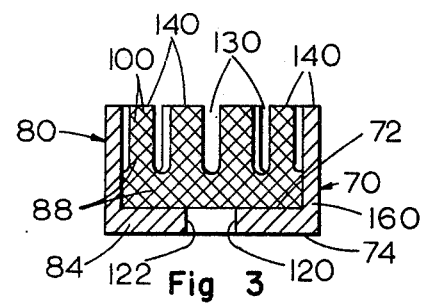
FIGURE 3 is a side elevation of the washer portion of the assembly with the forward half removed.

The lock nut assembly of this invention is generally indicated at 20 in FIGURE 1 and comprises a nut 24 preferably having a polygonal outer surface 30, as seen in top plan view.

The nut 24 has a bore 36 therethrough the wall of which has threads 40 thereon.

A nut extension or collar 50 is attached to the lower end of the nut 24 and is preferably integral therewith. The collar 50 has a bottom surface 54 on a side thereof opposite the nut 24, the bottom surface 54 being disposed approximately in a plane at a right angle to the axis 56 of the bore 36. The collar 50 has a central opening 60 which is preferably threaded also, its threads, as seen at 62, being continuous with the threads 40.

The assembly 20 further includes a washer generally indicated at 70 having an upper surface 72 which engages the bottom surface 54 of the collar 50, the washer 70 also having a lower surface 74 on a side of the washer which is opposite the collar 50.

The upper and lower surfaces 72 and 74 of the washer 70 are disposed in planes approximately at a right angle to the axis 56.

The washer 70 has an annular side flange means 80 protruding upwardly from the outer edges of a lower washer portion 84, which latter is substantially disc-like. The flange means 80 has an approximately cylindrical inner wall 88 which is coaxial with the bore 36 of the nut.

The inner wall 88 snugly fits an approximately cylindrical outer wall 90 of the collar 50 so that during rotation of the collar 50 with respect to the washer 70, a substantial friction exists between the collar 50 and the inner wall 88. To increase this friction, the inner wall 88 can be somewhat rough or serrated with criss-cross serrations indicated at 100 and the collar 50 has an approximately cylindrical outer wall 120 which is coaxial with the bore 36 which is also rough preferably having criss-cross serrations 110.

The lower portion 84 of the washer 70 has a hole 120 therethrough which is coaxial with the bore 36 and which has a cylindrical wall 122 of larger diameter than the bore 36 and is unthreaded.

The flange means 80 has a plurality of elongated spaced recessses 130 extending into what would otherwise be a cylindrical flange means and the recesses 130 define spaced fingers 140 which are formed of resilient material and which are biased inwardly toward the axis 56 for pressing on the outer wall 102 of the collar 50 to prevent rotation of the collar 50 therein to resist loosening of the nut 24. The flange means 80 has a solid cylindrical portion 160 beneath the fingers 140.

The washer 70 has a lower surface 74 which is rough, as is preferably accomplished by criss-cross serrations 170 to increase frictional engagement with the workpiece, not shown, to retain the washer 70 against rotation after the nut 24 has sufficiently pressed the washer 70 against such workpiece.

Figure 4:
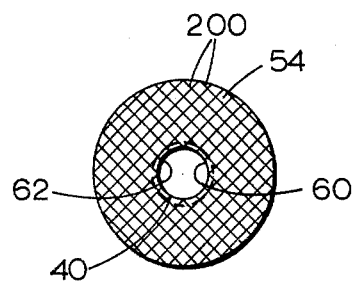
FIGURE 4 is a bottom plan view of the collar.

As best seen in FIGURE 4, the undersurface 54 of the collar 50 is rough to minimize tendency of the nut 24 to loosen by vibration, whereby it functions as a true lock nut assembly, the roughness of the undersurface being accomplished by means of, for example, criss-cross serration lines 200.

Figure 6:
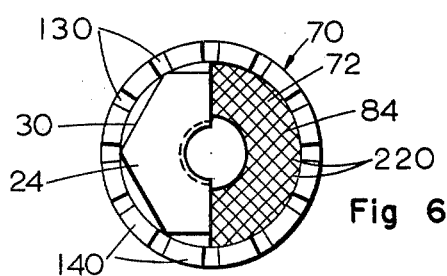
FIGURE 6 is a composite diagrammatic view showing on its left-hand side a top plan view of the left-hand side of the assembly of FIGURE 1 and showing on its right-hand side a top plan view of the right-hand side of the assembly of FIGURE 1 with the right-hand side of the nut and collar removed.

As best seen in FIGURE 6, the upper surface 72 of the lower portion 84 of the washer 70 is rough as is accomplished by criss-crossed serration lines 220 for friction against the undersurface 54 of the collar 50 to minimize tendency of the collar 50 to rotate to prevent loosening of the nut 24.

Application of the lock nut is done by keeping the nut and washer together and handling them as a unit during both storage and application to a bolt, friction and the pressure of the fingers 140 holding them together. As the assembly is tightened against a workpiece, it will turn as a unit until the washer comes into sufficient contact with the workpiece that its undersurface 74 presses enough to stop rotation of the washer.

At this point, the nut is not yet tight enough. The nut is then turned more against the friction of the washer until the nut is tightened to its proper tension preferably with a torque wrench, the said additional turning of the nut with respect to the washer being about forty degrees.

A reversal of the same process, namely, a forty degree turning of the nut in the opposite direction will loosen the assembly so the nut and washer can be removed by rotating them as a unit.

The factor of friction which is accomplished by engagement of the side of the collar with the inside of the washer is especially advantageous in locking the nut in place against all manner of vibrations.

The fingers 140 of the washer and, in fact, the entire washer 70, should be made preferably integrally and as a unit from spring steel, to provide a resilient material for the inward pressure of the fingers against the collar.

A particular advantage is found in that the size of the assembly is not penalized and the amount of thread surface is maximum and not penalized, whereby damage to the bolt is avoided more completely than in the prior art.

Figure 5:
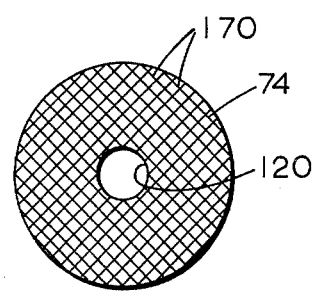
FIGURE 5 is a bottom plan view of the washer.

It is to be understood that the criss-cross grooves or serrations 170 of the underside of the washer 70 are only diagrammatically shown in FIGURE 5. In practice, the grooves can be so deep as to cause the ridges between the grooves to be sharp for penetration into the metal or material of a workpiece, not shown, against which the undersurface 74 may be disposed.

This penetration is important inasmuch as resistance of the nut from loosening with respect to the washer is great because of many factors of frictional resistance above mentioned, whereas loosening of the washer with respect to the work surface depends to a great extent upon its friction with respect to the work surface as enhanced by the penetration of the washer into the work surface because of the sharpness of the ridges between the grooves or serrations 170.

However, it will be seen that rotation of the washer is also resistant by its engagement with the collar and by the friction between the threads of the collar and nut and a bolt, not shown, which latter friction also resists rotation.

Altogether, a lock nut very highly resistant to loosening under all conditions is provided.

It will be seen that parts of the exterior of the nut extension 50 which are lapped by the washer flange means 80 extend outwardly from the rotational axis of the nut 24 substantially no greater distance than the length of the radius of the cylindrical outer surface of the extension 50 to make possible easy and rapid assembly with the flange means slipping more easily onto the flange means 80 than if this relationship were not in the construction.

It will also be seen that that side of the washer which faces the adjacent end of the substantially cylindrical extension or portion 50 has a first substantially flat surface which has been called the upper surface 74 and the annular end surface of the substantially cylindrical extension 50 defines a second substantially flat surface 54 which has been called the bottom surface 54. At least one, and preferably both, of the substantially flat surfaces 54 and 72 are rough to minimize the tendency of the nut to loosen by undesired rotation with respect to the washer.

Also it will be seen that certain other surface areas of the washer and of the cylindrical extension which are in engagement with each other are rough to tend to prevent the nut from loosening by undesired rotation as described.

It is believed that this invention has fulfilled the objectives above set forth in providing a much superior, more secure, and more rapidly operating lock nut assembly.

I claim:

1. A lock nut and washer assembly comprising: a nut having an axis of rotation and having an outer surface of a polygonal shape, said nut having an extension attached to one end thereof and having a substantially cylindrical exterior surface, a washer having a central portion having an upper surface engaging one end of said extension and having an opening surrounding said axis, said washer having a peripheral upstanding flange means comprising at least three spaced resilient upstanding fingers, said fingers each having an innermost surface, said innermost surfaces lying substantially in a cylindrical configuration, said fingers lapping and pressing against the cylindrical exterior surface of said extension on at least two opposite sides thereof to deter rotation of said extension with respect to said washer and to unite said nut and said washer into a unit during the period before application of the assembly to a workpiece, the unitary assembly making possible simultaneous handling by a workman, said fingers not substantially overlapping said polygonal portion so as not to substantially interfere with the application of a wrench to the said polygonal outer surface of said nut, the said substantially cylindrical surface of said nut extension being sufficiently cylindrical, and the said extension surface and the shape of said fingers being sufficiently cooperative, as to permit the rotation of said nut with respect to said fingers in each of two opposite directions without the necessity of breakage of said fingers, parts of the exterior of said extension which are lapped by said washer flange means extending outwardly from the axis of said nut substantially no greater distance than the radius of said cylindrical surface, said extension having an opening therethrough along said axis, said cylindrical surface having as its axis the axis of said nut.

2. The combination of claim 1 in which that side of said washer which faces the adjacent end of said extension has a first substantially flat surface, and the end surface of said extension which faces said washer defines a second substantially flat surface and in which one of said substantially flat surfaces is rough to minimize the tendency of said nut to loosen by undesired rotation.

3. The combination of claim 1 in which certain abutting surface areas of said washer and of said extension are rough to minimize tendency of said nut to loosen by undesired rotation.

4. The combination of claim 1 in which said washer central portion is substantially flat on both the top and the bottom surfaces thereof.

References Cited

UNITED STATES PATENTS

| | | | |
|---|---|---|---|
| 1,269,059 | 6/1918 | D'Arden | 151—47 |
| 2,082,228 | 6/1937 | Stoll | 151—48 |
| 2,141,701 | 12/1938 | Uherkovich | 151—13 |
| 2,675,044 | 4/1954 | Poupitch | 151—41.5 |
| 2,992,018 | 7/1961 | Rosan | 151—41.5 |
| 3,190,334 | 6/1965 | Wigam | 151—37 |

FOREIGN PATENTS

| | | |
|---|---|---|
| 667,058 | 6/1929 | France. |
| 1,282,082 | 12/1961 | France. |
| 296,754 | 5/1954 | Switzerland. |

MARION PARSONS, Jr., Primary Examiner